United States Patent
Bilancia et al.

(10) Patent No.: US 10,138,783 B2
(45) Date of Patent: Nov. 27, 2018

(54) METHOD FOR THERMALLY REGULATING AN INJECTOR FOR INJECTING A REDUCING AGENT INTO AN EXHAUST PIPE OF AN INTERNAL COMBUSTION ENGINE

(71) Applicant: GM GLOBAL TECHNOLOGY OPERATIONS LLC, Detroit, MI (US)

(72) Inventors: Michele Bilancia, Turin (IT); Giorgio Sticchi, Maglie (IT); Luis Daniel Guerrero Cruz, Turin (IT); Stefano Cassani, Altavilla Monferrato (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 172 days.

(21) Appl. No.: 15/236,537

(22) Filed: Aug. 15, 2016

(65) Prior Publication Data

US 2017/0044951 A1 Feb. 16, 2017

(30) Foreign Application Priority Data

Aug. 14, 2015 (DE) .................. 20 2015 005 776 U

(51) Int. Cl.
*F01N 3/20* (2006.01)
*F01N 9/00* (2006.01)
(52) U.S. Cl.
CPC ......... *F01N 3/2046* (2013.01); *F01N 3/2066* (2013.01); *F01N 9/00* (2013.01);
(Continued)
(58) Field of Classification Search
CPC ........ F01N 3/2046; F01N 3/2066; F01N 9/00;
F01N 2610/02; F01N 2610/11; F01N 2610/1453; F01N 2610/146; F01N 2900/1811; F01N 2900/1821; Y02T 10/24; Y02T 10/47
See application file for complete search history.

(56) References Cited

U.S. PATENT DOCUMENTS

| 8,122,710 B2 | 2/2012 | Schmale et al. |
| 2014/0020364 A1* | 1/2014 | Wittrock .................. F01N 3/10 |
| | | 60/274 |

FOREIGN PATENT DOCUMENTS

| DE | 102014103986 A1 * | 6/2015 | ............. F01N 3/043 |
| DE | 102014207834 A1 | 10/2015 | |

OTHER PUBLICATIONS

Machine translation of DE 102014103986 A1.*
German Patent Office, German Search Report for German Application No. 202015005776.4, dated Mar. 1, 2016.

* cited by examiner

Primary Examiner — Brandon Lee
(74) Attorney, Agent, or Firm — Lorenz & Kopf, LLP

(57) ABSTRACT

A computer program, system and method are provided for thermally regulating an injector injecting a reducing agent into an exhaust pipe of an internal combustion engine. A pump is activated to deliver a coolant in a coolant circuit having a portion in heat exchange relation with the injector. A value is determined for a mass flow rate of the coolant delivered by the pump. A value is calculated for a temperature of the injector as a function of the determined value of the mass flow rate. A difference is calculated between the calculated value of the injector temperature and a predetermined set-point value thereof, and the mass flow rate of the coolant delivered by the pump is adjusted on the basis of the calculated difference.

11 Claims, 3 Drawing Sheets

(52) U.S. Cl.
CPC ....... *F01N 2610/02* (2013.01); *F01N 2610/11* (2013.01); *F01N 2610/146* (2013.01); *F01N 2610/1453* (2013.01); *F01N 2900/1811* (2013.01); *F01N 2900/1821* (2013.01); *Y02T 10/24* (2013.01); *Y02T 10/47* (2013.01)

METHOD FOR THERMALLY REGULATING AN INJECTOR FOR INJECTING A REDUCING AGENT INTO AN EXHAUST PIPE OF AN INTERNAL COMBUSTION ENGINE

CROSS-REFERENCE TO RELATED APPLICATION

This application claims priority to German Patent Application No. 202015005776.4, filed Aug. 14, 2015, which is incorporated herein by reference in its entirety.

TECHNICAL FIELD

The present disclosure pertains to a computer program for thermally regulating an injector of a selective catalytic reduction (SCR) system of an internal combustion engine, particularly an internal combustion engine of a motor vehicle, such as for example a passenger car or a truck.

BACKGROUND

It is known that some internal combustion engines are equipped with an SCR system to reduce the emissions of nitrogen oxides (NOx). The SCR system generally includes a catalyst disposed in an exhaust pipe of the engine to convert the nitrogen oxides into diatonic nitrogen and water with the aid of a reducing agent. The reducing agent may be provided by an injector, which is located in the exhaust pipe upstream of the catalyst. Due to its position, the injector may become extremely hot and needs to be adequately cooled down. One of the solution currently adopted for performing this task is that of deviating part of the engine coolant into an auxiliary circuit having at least one portion in heat exchange relation with the injector. An example of this solution is described in the patent publication EP2192280.

A side effect of this solution is that the coolant pump, which delivers the engine coolant into the auxiliary circuit, is always active and arranged for generating a mass flow rate of coolant which is independent from the real cooling needs of the injector. In order to always guarantee a proper cooling of the injector, this mass flow rate takes into account the worst thermal conditions under which the injector may operate. However this approach implies that, when the injector is not operating under the worst thermal conditions, the power consumed by the coolant pump may become unnecessarily high, thereby causing a considerable impact on the fuel consumption.

SUMMARY

The present disclosure provides a solution for efficiently and properly thermally regulating an injector of an SCR system, while allowing a reduction of the fuel consumption in a simple, rational and rather inexpensive solution. An embodiment of the present disclosure provides a computer program for thermally regulating an injector for injecting a reducing agent into an exhaust pipe of an internal combustion engine. A pump is activated to deliver a coolant in a coolant circuit having a portion in heat exchange relation with the injector. A value of a mass flow rate of the coolant delivered by the pump is determined. A value of a temperature of the injector is determined as a function of the determined value of the mass flow rate. A difference between the calculated value of the injector temperature and a predetermined set-point value thereof is calculated. The mass flow rate of the coolant delivered by the pump is adjusted on the basis of the calculated difference.

By adjusting the mass flow rate of the coolant that circulates in the coolant circuit, this solution achieves the effect that the injector temperature may be always maintained around the set-point value thereof, independently from the thermal condition under which the injector is operating. In other words, the pump may be operated to always deliver the minimum mass flow rate of the coolant, which is necessary to maintain the set-point value of the injector temperature. So, if the injector is operating under very hard thermal conditions, the mass flow rate of the coolant will be adequately high, but if the injector is operating under more favorable thermal conditions, the pump will be operated to reduce the mass flow rate of the coolant, thereby saving power and thus reducing the fuel consumption.

According to an aspect of the computer program, calculation of the value of the injector temperature may include solving a thermal mathematical model of the injector. This aspect has the effect of allowing the calculation of a reliable value of the injector temperature.

In this regard, solving of the thermal mathematical model may use a value of one or more of the following additional parameters: a mass flow rate of an exhaust gas flowing into the exhaust pipe, a temperature of the exhaust gas, a mass flow rate of the reducing agent injected by the injector, a temperature of the reducing agent, a temperature of the coolant, an ambient temperature, a voltage applied to an electric coil actuating the injector, an electric current flowing through the electric coil. As a result, the thermal mathematical model may take into account a lot of thermal contributions that concur to determine the temperature of the injector, including for example the heat generated by the electric coil actuating the injector, the heat exchange between the injector and the exhaust gas in the exhaust gas pipe, the heat exchange between the injector and the external ambient, the heat exchange between the exhaust gas in the exhaust pipe and the wall of the exhaust pipe, and the heat exchange between the wall of the exhaust pipe and the external ambient.

According to another aspect, the computer program adjusts the mass flow rate of the coolant. A correction value of the mass flow rate of the coolant is calculate as a function of the calculated difference A base value of the mass flow rate of the coolant is calculated as a function of the set-point value of the injector temperature. A requested value of the mass flow rate of the coolant is calculated as a sum of the base value and the correction value. The pump is operated to deliver the requested value of the mass flow rate of the coolant. This aspect combines a feed forward control approach, which has the effect of allowing a fast reaction to the transients of the engine working conditions, with a feedback control approach, which has the effect of compensating for the engine/environmental thermal transient conditions.

An aspect of the computer program may applying the calculated difference as input to a controller that yields as output the correction value for calculating the correction value of the mass flow rate of the coolant. This aspect provides a reliable solution to carry out the feedback approach within the proposed combined strategy.

According to an aspect of the computer program, the controller may be chosen among a proportional controller, a proportional-integrative controller and a proportional-integrative-derivative controller. This aspect allows to properly tune the feedback control approach according to the specific requirements of the system.

According to another aspect of the computer program, the calculation of the base value of the mass flow rate of the coolant includes solving a thermal mathematical model of the injector. This aspect has the effect of allowing the calculation of a reliable base value of the mass flow rate of the coolant.

In this regard, the thermal mathematical model used for calculating the base value of the mass flow rate of the coolant may be the same thermal mathematical model used for calculating the value of the injector temperature. This aspect of the present disclosure has the advantage of guaranteeing a uniform of reliability to the strategy.

The present solution may be also embodied in the form of a computer program product including a carrier on which the computer program is stored. In particular, the present disclosure may be embodied in the form of a control apparatus for an injector for injecting a reducing agent into an exhaust pipe of an internal combustion engine, including an electronic control unit, a data carrier associated to the electronic control unit and the computer program stored in the data carrier. Another embodiment may provide an electromagnetic signal modulated to carry a sequence of data bits, which represent the computer program.

Another embodiment of the solution provides an apparatus for thermally regulating an injector for injecting a reducing agent into an exhaust pipe of an internal combustion engine. In particular, an electronic control unit or other means is configured to activate a pump to deliver a coolant in a coolant circuit having a portion in heat exchange relation with the injector, determine a value of a mass flow rate of the coolant delivered by the pump, calculate a value of a temperature of the injector as a function of the determined value of the mass flow rate, calculate a difference between the calculated value of the injector temperature and a predetermined set point value thereof, and adjust the mass flow rate of the coolant delivered by the pump on the basis of the calculated difference. This embodiment achieves basically the same effects described for the corresponding computer program, in particular that of efficiently controlling the temperature of the injector while reducing the fuel consumption.

According to an aspect of the apparatus, calculating the value of the injector temperature may include solving a thermal mathematical model of the injector. This aspect has the effect of allowing the calculation of a reliable value of the injector temperature.

In this regard, solving the thermal mathematical model may include using a value of one or more of the following additional parameters: a mass flow rate of an exhaust gas flowing into the exhaust pipe, a temperature of the exhaust gas, a mass flow rate of the reducing agent injected by the injector, a temperature of the reducing agent, a temperature of the coolant, an ambient temperature, a voltage applied to an electric coil actuating the injector, an electric current flowing through the electric coil. As a result, the thermal mathematical model may take into account a lot of thermal contributions that concur to determine the temperature of the injector.

According to another aspect of the apparatus, the electronic control unit or other means may be configured to adjust the mass flow rate of the coolant by calculating a correction value of the mass flow rate of the coolant as a function of the calculated difference, calculating a base value of the mass flow rate of the coolant as a function of the set-point value of the injector temperature, and calculating a requested value of the mass flow rate of the coolant as a sum of the base value and the correction value. The pump is operated to deliver the requested value of the mass flow rate of the coolant. This aspect combines a feed forward control approach, which has the effect of allowing a fast reaction to the transients of the engine working conditions, with a feedback control approach, which has the effect of compensating for the engine/environmental thermal transient conditions.

An aspect of the apparatus may prescribe that calculation of the correction value of the mass flow rate of the coolant includes applying the calculated difference as input to a controller that yields as output the correction value. This aspect provides a reliable solution to carry out the feedback approach within the proposed combined strategy.

According to an aspect of the apparatus, the controller may be chosen among a proportional controller, a proportional-integrative controller and a proportional-integrative-derivative controller. This aspect allows to properly tune the feedback control approach according to the specific requirements of the system.

According to another aspect of the apparatus, calculation of the base value of the mass flow rate of the coolant includes solving a thermal mathematical model of the injector.

This aspect has the effect of allowing the calculation of a reliable base value of the mass flow rate of the coolant. In this regard, the thermal mathematical model used for calculating the base value of the mass flow rate of the coolant may be the same thermal mathematical model used for calculating the value of the injector temperature. This aspect of the present disclosure has the advantage of guaranteeing a uniform of reliability to the strategy.

Still another embodiment of the solution provides a method of thermally regulating an injector for injecting a reducing agent into an exhaust pipe of an internal combustion engine. A pump is activated to deliver a coolant in a coolant circuit having a portion in heat exchange relation with the injector. A value is calculated for the mass flow rate of the coolant delivered by the pump. A value is calculated for the temperature of the injector as a function of the determined value of the mass flow rate. A difference between the calculated value of the injector temperature and a predetermined set-point value thereof is calculated, and the mass flow rate of the coolant delivered by the pump is adjusted on the basis of the calculated difference.

This embodiment achieves basically the same effects described for the corresponding computer program, in particular that of efficiently controlling the temperature of the injector while reducing the fuel consumption.

According to an aspect of the method, the calculation of the value of the injector temperature may include solving a thermal mathematical model of the injector. This aspect has the effect of allowing the calculation of a reliable value of the injector temperature.

In this regard, the solving of the thermal mathematical model may use a value of one or more of the following additional parameters: a mass flow rate of an exhaust gas flowing into the exhaust pipe, a temperature of the exhaust gas, a mass flow rate of the reducing agent injected by the injector, a temperature of the reducing agent, a temperature of the coolant, an ambient temperature, a voltage applied to an electric coil actuating the injector, an electric current flowing through the electric coil. As a result, the thermal mathematical model may take into account a lot of thermal contributions that concur to determine the temperature of the injector.

According to another aspect of the method, the adjustment of the mass flow rate of the coolant may include calculating a correction value of the mass flow rate of the coolant as a function of the calculated difference, calculating a base value of the mass flow rate of the coolant as a function of the set-point value of the injector temperature, calculating a requested value of the mass flow rate of the coolant as a sum of the base value and the correction value, and operating the pump to deliver the requested value of the mass flow rate of the coolant. This aspect combines a feed forward control approach, which has the effect of allowing a fast reaction to the transients of the engine working conditions, with a feedback control approach, which has the effect of compensating for the engine/environmental thermal transient conditions.

An aspect of the method may prescribe that the calculation of the correction value of the mass flow rate of the coolant includes applying the calculated difference as input to a controller that yields as output the correction value. This aspect provides a reliable solution to carry out the feedback approach within the proposed combined strategy.

According to an aspect of the method, the controller may be chosen among a proportional controller, a proportional-integrative controller and a proportional-integrative-derivative controller. This aspect allows to properly tune the feedback control approach according to the specific requirements of the system.

According to another aspect of the method, the calculation of the base value of the mass flow rate of the coolant includes the step of solving a thermal mathematical model of the injector. This aspect has the effect of allowing the calculation of a reliable base value of the mass flow rate of the coolant.

In this regard, the thermal mathematical model used for calculating the base value of the mass flow rate of the coolant may be the same thermal mathematical model used for calculating the value of the injector temperature. This aspect of the present disclosure has the advantage of guaranteeing a uniform of reliability to the strategy.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
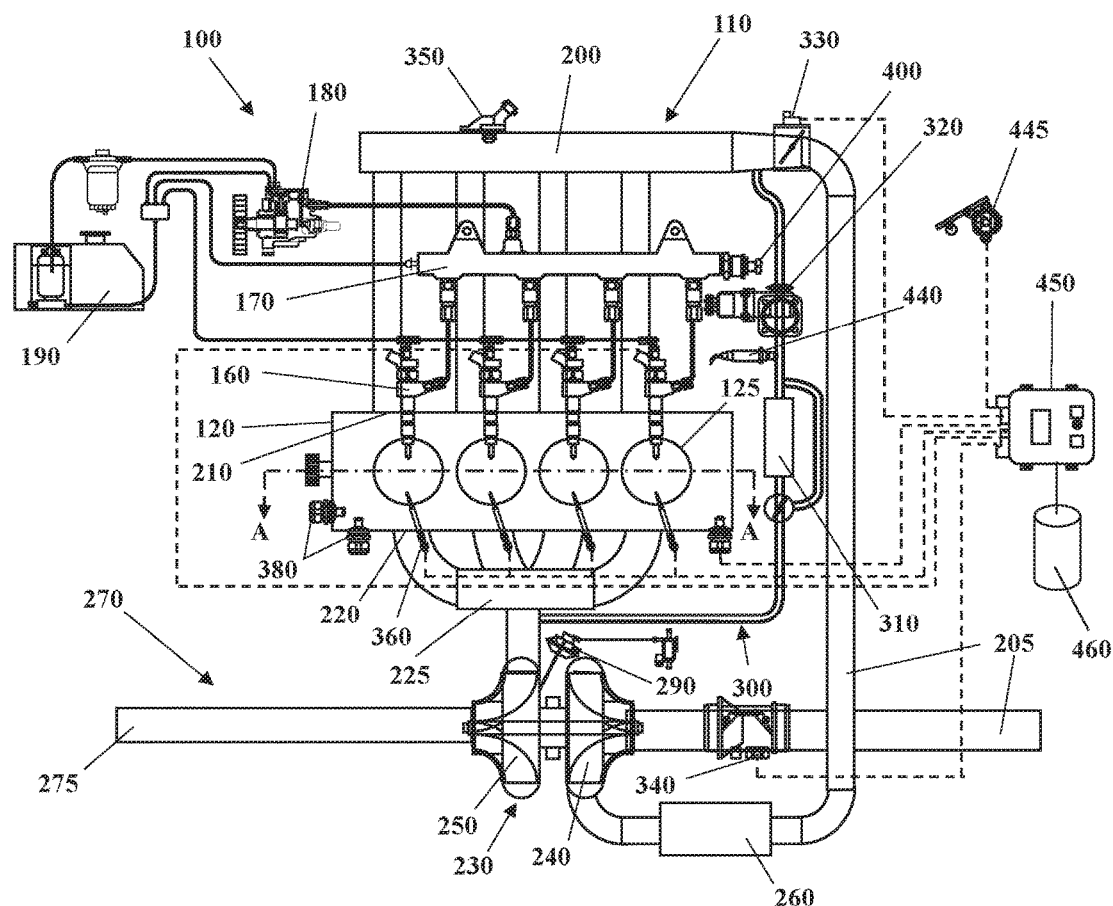
FIG. 1 shows an automotive system.
Figure 2:
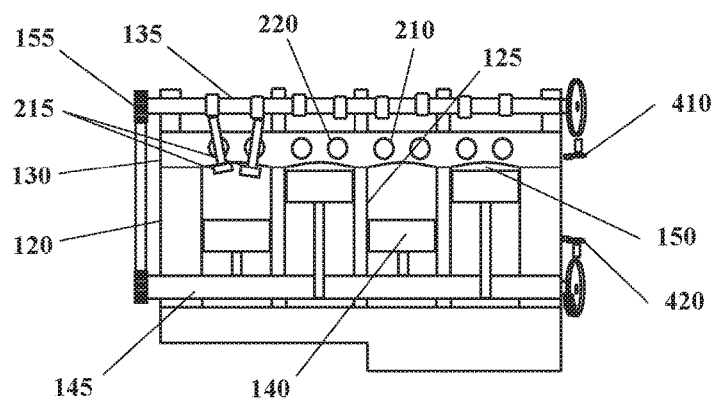
FIG. 2 is a cross-section of an internal combustion engine belonging to the automotive system of FIG. 1.

Some embodiments may include a motor vehicle (e.g., a passenger car) that embodies an automotive system 100, as shown in FIGS. 1 and 2. The automotive system 100 includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high-pressure fuel pump 180 that increases the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. This example shows a variable geometry turbine (VGT) with a VGT actuator 255 arranged to move the vanes to alter the flow of the exhaust gases through the turbine 250. In other embodiments, the turbocharger 230 may be fixed geometry and/or include a waste gate.

Figure 3:
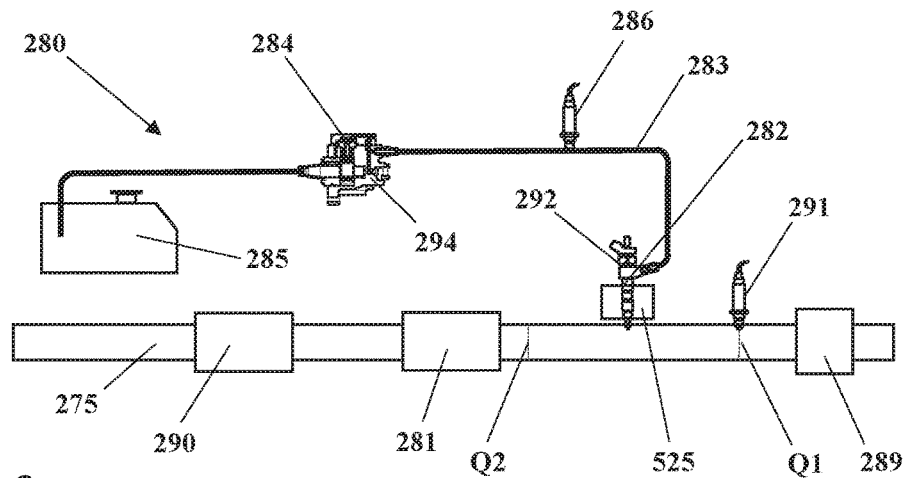
FIG. 3 is a schematic representation of an SCR system belonging to the automotive system of FIG. 1.

The exhaust gases exit the turbine 250 and are directed into an exhaust system 270. The exhaust system 270 may include an exhaust pipe 275 having one or more exhaust aftertreatment devices, as shown in FIG. 3. The aftertreatment devices may be any device configured to change the composition of the exhaust gases. In the present example, the aftertreatment devices include a selective catalytic reduction (SCR) system 280 that includes an SCR catalyst 281 (also referred as SCR converter) which is disposed in the exhaust pipe 275 for converting the nitrogen oxides contained in the exhaust gas into diatonic nitrogen and water. The conversion is operated with the aid of a liquid reducing agent (e.g. urea), which is injected into the exhaust pipe 275 upstream of the SCR catalyst 281. In this way, the reducing agent, also referred as diesel exhaust fluid (DEF), mixes with the exhaust gas and vaporizes, before being absorbed and stored into the SCR catalyst 281. The reducing agent is injected in the exhaust pipe 275 by means of a DEF injector 282, which is disposed upstream of the SCR catalyst 281. The DEF injector 282 usually includes a nozzle located inside the exhaust pipe 275 and a needle that is movable from a closed position to an open position of the DEF injector nozzle, and vice versa. The needle is normally maintained in the closed position, for example by a spring.

The DEF injector 282 may further include an electrical coil 292 that can be selectively powered to move the needle in the open position. The reducing agent is provided to the DEF injector 282 from a supply conduit 283, which is in fluid communication with a DEF pump 284 that increases the pressure of the reducing agent received from a DEF tank 285. The DEF pump 285 may be actuated by an electric motor 294. The SCR system 280 may also include a DEF pressure and temperature sensor 286 disposed in the supply conduit 283 for measuring the pressure and the temperature of the reducing agent therein. The aftertreatment devices may further include an oxidation catalysts 289 disposed in the exhaust pipe 275 upstream of the DEF injector 282, and a particulate filters 290 disposed in the exhaust piper 275 downstream of the SCR catalyst 281. Other embodiments may further include an exhaust gas recirculation (EGR) system 300, as shown in FIG. 1, coupled between the exhaust manifold 225 and the intake manifold 200. The EGR system 300 may include an EGR cooler 310 to reduce the temperature of the exhaust gases in the EGR system 300 and an EGR valve 320 to regulate a flow of exhaust gases in the EGR system 300.

Figure 4:
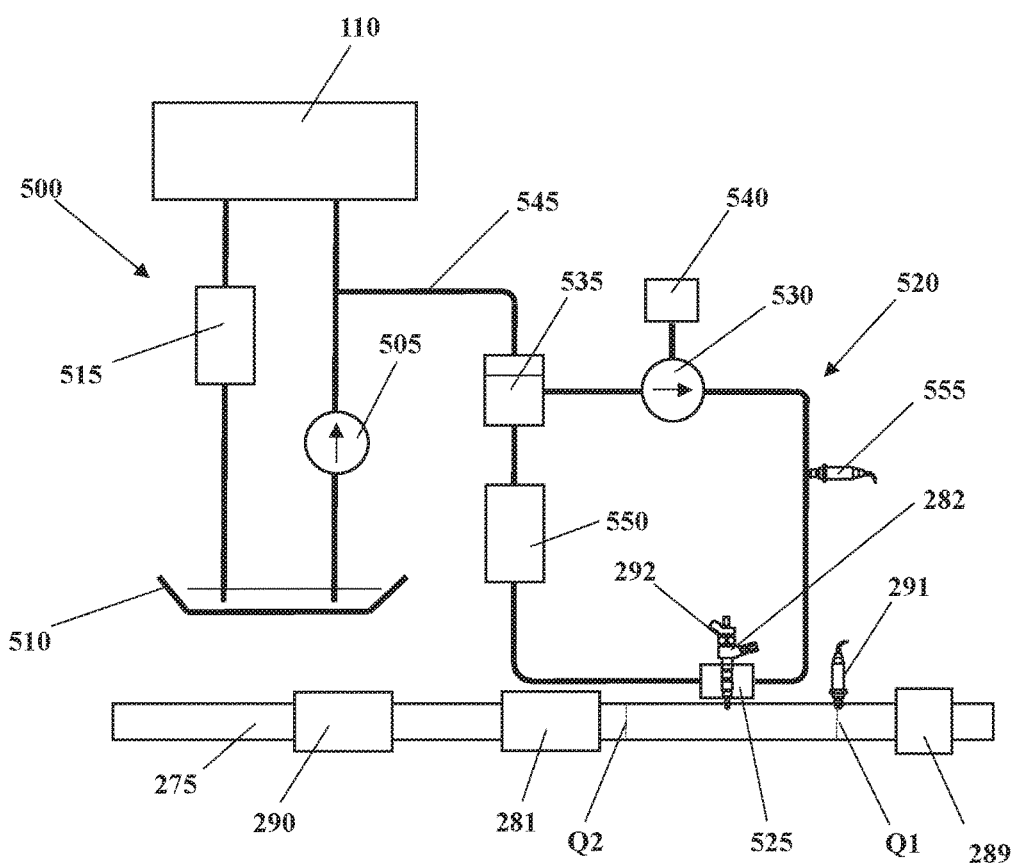
FIG. 4 is a schematic representation of a cooling system for a DEF injector of the SCR system of FIG. 3.

The automotive system 100 may further include an engine cooling circuit 500 for cooling the ICE 110, as schematically shown in FIG. 4. The engine cooling circuit 500 schematically includes a main coolant pump 505 (which is usually mechanically coupled to be driven by the crankshaft 145) that delivers a coolant, typically a mixture of water and antifreeze, from a coolant tank 510 to the ICE 110 (e.g. to a plurality of cooling channels internally defined by the engine block 120 and by the cylinder head 130), and a radiator 515 for cooling down the coolant, once it has passed through the ICE 110 and before it returns to the coolant tank 510.

The engine cooling circuit 500 may be hydraulically connected to an auxiliary cooling circuit 520 provided for cooling the DEF injector 282. The auxiliary cooling circuit 520 includes a portion, hereinafter referred as heat exchanger and indicated with 525 in the drawings, in which the coolant is in heat exchange relation with the DEF injector 282, while remaining physically separated from the reducing agent and from the exhaust gas in the exhaust pipe 275. The coolant is provided to the heat exchanger 525 by an auxiliary pump 530, which increases the pressure of the coolant received by an auxiliary tank 535 (e.g. a water separator). The auxiliary pump 530 may be actuated by an electric motor 540, which may be operated independently from the main coolant pump 505. The auxiliary tank 535 is hydraulically coupled to the engine cooling circuit 500 via a connection conduit 545, so that part of the coolant, which circulates in the engine coolant circuit 505 under the action of the main coolant pump 505, may flow and be accumulated inside the auxiliary tank 535. The auxiliary cooling circuit 520 may further include an auxiliary radiator 550 for cooling down the coolant circulating in the auxiliary cooling circuit 520, once it has passed through the heat exchanger 525 and before it returns to the auxiliary tank 535. The auxiliary cooling circuit 520 may be further provided with a temperature sensor 555 for measuring the temperature of the coolant at the inlet of the heat exchanger 525.

The automotive system 100 may further include an electronic control unit (ECU) 450 in communication with one or more sensors and/or devices associated with the ICE 110, as shown in FIG. 1. The ECU 450 may receive input signals from various sensors configured to generate the signals in proportion to various physical parameters associated with the ICE 110. The sensors include, but are not limited to, the DEF pressure and temperature sensor 286, an exhaust gas temperature sensor 291 disposed in the exhaust pipe 275 between the oxidation catalyst 289 and the SCR catalyst 281, for example upstream of the DEF injector 282, a mass airflow and temperature sensor 340, a manifold pressure and temperature sensor 350, a combustion pressure sensor 360, coolant and oil temperature and level sensors 380, a fuel rail pressure sensor a cam position sensor 410, a crank position sensor 420, an EGR temperature sensor 440, an accelerator pedal position sensor 445 and the temperature sensor 555. Furthermore, the ECU 450 may generate output signals to various control devices that are arranged to control the operation of the ICE 110, including, but not limited to, the fuel injectors 160, the coil 292 of the DEF injector 282, the electric motor 294 of the DEF pump 284, the electric motor 540 of the auxiliary coolant pump 530, the throttle body 330, the EGR Valve 320, the VGT actuator 255, the cam phaser 155 and the electric motor 540 of the pump 530. Note, dashed lines are used to indicate communication between the ECU 450 and the various sensors and devices, but some are omitted for clarity.

Turning now to the ECU 450, this apparatus may include a digital central processing unit (CPU) in communication with a memory system 460 and an interface bus. The CPU is configured to execute instructions stored as a program in the memory system 460, and send and receive signals to/from the interface bus. The interface bus may be configured to send, receive, and modulate analog and/or digital signals to/from the various sensors and control devices. The memory system 460 may include various storage types including optical storage, magnetic storage, solid-state storage, and other non-volatile memory. The program stored in the memory system 460 is transmitted from outside via a cable or in a wireless fashion. Outside the automotive system 100, the program is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

The program stored in the memory system 460 of the ECU 450 may embody the method that will be disclosed hereinafter, allowing the CPUs to carryout out the steps of such method and control the ICE 110.

Figure 5:
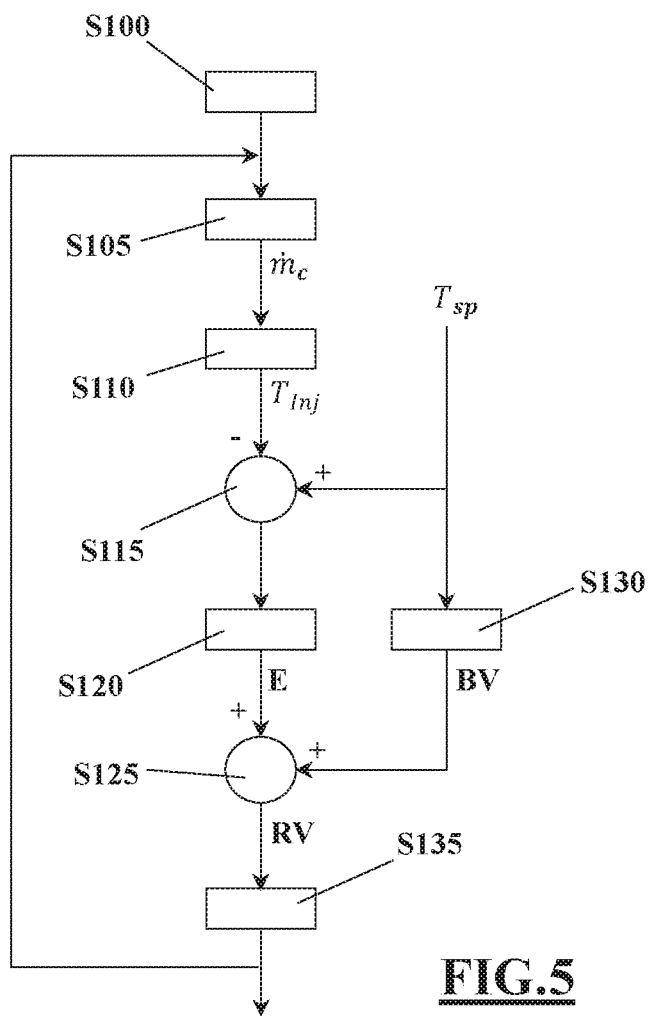
FIG. 5 is a flowchart that represents a strategy for cooling the DEF injector according to an embodiment of the present disclosure.

The method here concerned is a method for thermally regulating the DEF injector 282 during the operation of the SCR system 280, an embodiment of which is represented by the flowchart of FIG. 5.

As a first step, the method provides for the ECU 450 to activate the auxiliary pump 530 (block S100) in order to cause the circulation of the coolant in the auxiliary cooling circuit 520: from the auxiliary tank 535 to the heat exchanger 525, from the heat exchanger 525 to the auxiliary radiator 550, and from the auxiliary radiator 550 back into the auxiliary tank 535. The auxiliary pump 530 may be activated by supplying an electrical current to the electric motor 540.

While the auxiliary pump 530 is operating, the method provides for the ECU 450 to determine (block S105) a value of a mass flow rate of the coolant delivered by the auxiliary pump 530 to the heat exchanger 525. This value $\dot{m}_c$ of the coolant mass flow rate may be calculated by the ECU 450 as a function of a displacement and of a speed of the auxiliary pump 530, wherein the speed of the pump may be indirectly measured from the electrical operating parameters of the electric motor 540.

The determined value $\dot{m}_c$ of the coolant mass flow rate may then be used by the ECU 450 to calculate (block S110) a value $T_{inj}$ of a temperature of the DEF injector 282, particularly of its nozzle. The value $T_{inj}$ of the injector temperature may be calculated by means of a thermal mathematical model of the DEF injector 282, namely an equation (e.g. a linear equation) that describes the heat flows that are absorbed by and released from the DEF injector 282 (i.e. its energy balance).

In particular, the energy balance of the DEF injector 282 may be described by the following equation:

$$\dot{Q}_{gi} - \dot{Q}_{ia} + \dot{Q}_{coil} = \dot{m}_u * c_{p_u} * (T_{u_{2'}} - T_{u_{1'}}) + \dot{m}_c * c_{p_c} * (T_{Cout} - T_{Cin}) + \quad (1)$$

$$m_c * c_{p_c} * \frac{dT_{Inj}}{dt} + m_u * c_{p_u} * \frac{dT_{Inj}}{dt} + m_{Inj} * c_{p_{Inj}} * \frac{dT_{Inj}}{dt}$$

wherein:
$\dot{Q}_{gi}$ is the heat flow from the exhaust gas in the exhaust pipe 275 to the DEF injector 282;
$\dot{Q}_{ia}$ is the heat flow from the DEF injector 282 to the external ambient;
$\dot{Q}_{coil}$ is the heat flow generated by the electrical coil 292 of the DEF injector 282;
$\dot{m}_u$ is the mass flow rate of the reducing agent flowing through the DEF injector 282;
$c_{p_u}$ is the specific heat of the reducing agent at constant pressure;
$T_{u_{2'}}$ is the temperature of the reducing agent at an outlet (e.g. nozzle) of the DEF injector 282;
$T_{u_{1'}}$ is the temperature of the reducing agent at an inlet of the DEF injector 282;
$\dot{m}_c$ is the mass flow rate of the coolant that flows through the DEF injector 282;
$c_{p_c}$ is the specific heat of the coolant at constant pressure,
$T_{Cout}$ is the temperature of the coolant at an outlet of the heat exchanger 525;
$T_{Cin}$ is the temperature of the coolant at an inlet of the heat exchanger 525;
$m_c$ is the mass of the coolant contained in the DEF injector 282;
$T_{Inj}$ is the temperature of the DEF injector 282;
$m_u$ is the mass of the reducing agent contained in the DEF injector 282;
$m_{Inj}$ is the mass of the DEF injector 282; and
$c_{p_{Inj}}$ is the specific heat of the DEF injector 282 at constant pressure.

As a matter of fact, the equation (1) disregards the heat that flows from the DEF injector 282 to the wall of the exhaust pipe 275, which, however, provides a negligible contribution to the energy balance because of the extremely small exchange area between the DEF injector 282 and the exhaust pipe wall.

In view of the above, the equation (1) describing the energy balance of the DEF injector 282 contains a few constants ($c_{p_u}$, $c_{p_c}$ and $c_{p_{Inj}}$), a few parameters that depend only on the geometry of the DEF injector 282 and that may thus be determined once for all and regarded as constants ($m_c$, $m_u$ and $m_{Inj}$), and several variables ($\dot{Q}_{gi}$, $\dot{Q}_{ia}$, $\dot{Q}_{coil}$, $\dot{m}_u$, $T_{u_{2'}}$, $T_{u_{1'}}$, $\dot{m}_c$, $T_{Cout}$, $T_{Cin}$ and $T_{Inj}$).

To determine the heat flow $\dot{Q}_{gi}$, it is possible to consider a portion of the exhaust pipe 275 included between a cross-section Q1, which is located upstream of the DEF injector 282 (e.g. at the outlet of the oxidation catalyst 289), and a cross-section Q2, which is located downstream of the DEF injector 282 (e.g. at the inlet of the SCR catalyst 281), as shown in FIGS. 3 and 4.

Considering this portion of the exhaust pipe 275, the heat flow $\dot{Q}_{gi}$ may be described by the following mathematical equation:

$$\dot{Q}_{gi} = h_{gi} * A_{g1} * (((T_2 + T_1)/2) - T_{Inj}) \quad (2)$$

wherein:
$h_{gi}$ is the global heat exchange coefficient between the exhaust gas and the DEF injector 282;
$A_{g1}$ is the surface of the DEF injector 282 in contact with the exhaust gas into the exhaust pipe 275;
$T_2$ is the temperature of the exhaust gas (mixed with the reducing agent) at the outlet Q2 of the aforesaid portion of the exhaust pipe 275; and
$T_1$ is the temperature of the exhaust gas at the inlet Q1 of the aforesaid portion of the exhaust pipe 275.

In view of the above, this heat flow equation (2) contains a constant ($h_{gi}$), a parameter ($A_{g1}$) that depends only on the geometry of the DEF injector 282, so that it may be determined once for all and regarded as a constant, and the unknown variables $T_2$, $T_1$ and $T_{Inj}$.

On the other side, the heat flow may be described by the following mathematical equation:

$$\dot{Q}_{ia} = h_{ia} * A_{ia} * (T_{Inj} - T_{amb}) \quad (3)$$

wherein:
$h_{ia}$ is the global heat exchange coefficient between the DEF injector 282 and the external ambient (i.e. external air);
$A_{ia}$ is the surface of the DEF injector 282 in contact with the external ambient; and
$T_{amb}$ is the temperature of the external ambient.

In view of the above, this heat flow equation (3) contains a constant ($h_{ia}$), a parameter ($A_{ia}$) that depends only on the geometry of the DEF injector 282, so that it may be determined once for all and regarded as constant, and the following variables $T_{Inj}$ and $T_{amb}$.

The heat flow $\dot{Q}_{coil}$ may be described in its turn by the following mathematical equation:

$$\dot{Q}_{coil} = V * I * \Delta t \quad (4)$$

wherein:

V is the voltage applied to the coil 292 of the DEF injector 282;

I is the electrical current flowing through the coil 292 of the DEF injector 282; and Δt is the time period during which the coil is powered.

Replacing the equations (2), (3) and (4) into the equation (1), the energy balance of the DEF injector 282 will be described by an equation having the following variables: $T_2$, $T_1$, $T_{amb}$, V, I, $M_u$, $T_{u_2'}$, $T_{u_1'}$, $\dot{m}_c$, $T_{Cout}$, $T_{Cin}$ and $T_{Inj}$.

The temperature $T_{u_2'}$ of the reducing agent at the outlet of the DEF injector 282 may be determined using a thermal mathematical model of the exhaust gas, namely an equation (e.g. a linear equation) that describes the heat flows that are absorbed and released by the exhaust gas in the aforementioned portion of the exhaust pipe 275 (i.e. energy balance). In particular, the energy balance of the exhaust gas may be described by the following equation:

$$-\dot{Q}_{gw} - \dot{Q}_{gi} = \dot{m}_g * c_{p_g} * (T_2 - T_1) + \quad (5)$$
$$\dot{m}_u * c_{p_u} * (T_2 - T_{u_2'}) + m_g * c_{p_g} * \frac{dT_2}{dt} + m_u * c_{p_u} * \frac{dT_2}{dt}$$

wherein:

$\dot{Q}_{gw}$ is the heat that flows from the exhaust gas to the wall of the aforementioned portion of the exhaust pipe 275;

$m_g$ is the mass of the exhaust gas contained in said portion of the exhaust pipe 275;

$\dot{m}_g$ is the mass flow rate of the exhaust gas flowing through the exhaust pipe 275; and $c_{p_g}$ is the specific heat of the exhaust gas at constant pressure.

In view of the above, the equation (5) describing the energy balance of the exhaust gas contains a few constants ($c_{p_u}$, $c_{p_c}$ and $c_{p_g}$), a parameter ($m_g$) that depends only on the geometry of the above-identified portion of the exhaust pipe 275 and that may thus be determined once for all and regarded as a constant, a parameter ($m_u$) that depend only on the geometry of the DEF injector 282 and that may thus be regarded as a constant, and several variables ($\dot{Q}_{gi}$, $\dot{Q}_{gw}$, $\dot{m}_u$, $T_{u_2'}$, $T_2$, $T_1$ and $\dot{m}_g$).

The heat flow $\dot{Q}_{gw}$ may be described by the following mathematical equation:

$$\dot{Q}_{gw} = h_{gw} * A_{gw} * (((T_2 + T_1)/2) - T_w) \quad (6)$$

wherein $h_{gw}$ is the global heat exchange coefficient between the exhaust gas and the wall of the above-identified portion of the exhaust pipe 275;

$A_{gw}$ is the surface of that portion of the exhaust pipe 275, which is in contact with the exhaust gas; and $T_w$ is the temperature of the wall of the above-identified portion of the exhaust pipe 275.

In view of the above, this heat flow equation (6) contains a constant ($h_{gw}$), a parameter ($A_{gw}$) that depends only on the geometry of the portion of the exhaust pipe 275, so that it may be determined once for all and regarded as a constant, and the following variables: $T_2$, $T_1$, $T_w$.

Replacing this equation (6) and the equation (2) into the equation (5), the energy balance of the exhaust gas will be described by an equation having the following variables: $T_{inj}$, $T_w$, $\dot{m}_u$, $T_{u_2'}$, $T_2$, $T_1$ and $\dot{m}_g$. Solving the equation (5) for $T_{u_2'}$ and replacing it into the equation (1), the energy balance of the DEF injector 282 will then depend on the following variables: $T_2$, $T_1$, $T_{amb}$, V, I, $\dot{m}_u$, $T_w$, $T_{u_1'}$, $\dot{m}_g$, $\dot{m}_c$, $T_{Cout}$, $T_{Cin}$ and $T_{inj}$.

The temperature $T_w$, of the wall of the above-identified portion of the exhaust pipe 275 may be determined by a thermal mathematical model of the wall, namely an equation (e.g. a linear equation) that describes the heat flows that are absorbed by and released from the wall of said portion of the exhaust pipe 275 (i.e. energy balance).

In particular, the energy balance of the exhaust pipe portion may be described by the following equation:

$$\dot{Q}_{gw} - \dot{Q}_{wa} = m_w * c_{p_w} * \frac{dT_w}{dt} \quad (7)$$

wherein:

$\dot{Q}_{wa}$ is the heat flow from the wall of the portion of the exhaust pipe 275 to the external ambient;

$m_w$ is the mass of the wall of said portion of the exhaust pipe 275; and $c_{p_w}$ is the specific heat of the exhaust pipe wall at constant pressure.

Also this equation (7) disregards the heat flow from the DEF injector 282 to the wall of the exhaust pipe 275.

In view of the above, the equation (7) describing the energy balance of the exhaust pipe wall contains a constant ($c_{p_w}$), a parameter ($m_w$) that depends only on the geometry of the exhaust pipe portion and that may thus be determined once for all and regarded as a constant; and several variables ($\dot{Q}_{gw}$, $\dot{Q}_{wa}$, and $T_w$).

The heat flow $\dot{Q}_{wa}$ may be described by the following mathematical equation:

$$\dot{Q}_{wa} = h_{wa} * A_{wa} * (T_w - T_{amb}) \quad (8)$$

wherein:

$h_{wa}$ is the global heat exchange coefficient between the wall of the exhaust pipe portion and the external ambient; and $A_{wa}$ is the surface of the exhaust pipe portion in contact with the external ambient.

In view of the above, this heat flow equation (8) contains a constant ($h_{wa}$), a parameter ($A_{wa}$) that depends only on the geometry of the exhaust pipe portion, so that it may be determined once for all and regarded as a constant, and the following variables: $T_{amb}$ and $T_w$.

Replacing this equation (8) and the equation (6) into the equation (7), the energy balance of the exhaust gas portion will be described by an equation having the following unknown variables: $T_2$, $T_1$, $T_{amb}$ and $T_w$. Solving the equation (7) for $T_w$ and replacing it into the equation (1), the energy balance of the DEF injector 282 will depend on the following variables: $T_2$, $T_1$, $T_{amb}$, V, I, $\dot{m}_u$, $T_w$, $T_{u_1'}$, $\dot{m}_g$, $\dot{m}_c$, $T_{Cout}$, $T_{Cin}$ and $T_{Inj}$.

According to an embodiment of the present disclosure, the method step S110 may thus provide for the ECU 450 to determine the value of each one of the following parameters: $T_2$, $T_1$, $T_{amb}$, V, I, $T_{u_1'}$, $\dot{m}_g$, $\dot{m}_u$, $T_{Cout}T_{Cin}$; and to calculate, with the mathematical model (1) describing the energy balance of the DEF injector 282, the value $T_{Inj}$ of the DEF injector temperature that corresponds to the determined value $\dot{m}_c$ of the coolant mass flow rate.

In this regard, the temperature value $T_1$ may be measured with the temperature sensor 291, the temperature value $T_2$ may be measured with an additional temperature sensor located between the DEF injector 282 and the SCR catalyst 281 or it may be estimated with another mathematical model, the temperature value $T_{amb}$ may be measured with a dedicated temperature sensor, the voltage value V and the electrical current value I may be determined from the electrical circuit connecting the coil 292 of the DEF injector 282 to the ECU 450, the temperature value $T_{u_1}$, may be measured with the temperature sensor 286, the value $\dot{m}_g$ of the mass flow rate of the exhaust gas may be determined on the basis of some engine operating parameters (e.g. engine speed and engine torque), the value $\dot{m}_u$ of the mass flow rate of reducing agent injected by the DEF injector 282 may be determined through the logic governing the operation of the SCR system 280, the temperature value $T_{Cin}$ may be measured with the temperature sensor 555, the temperature value $T_{Cout}$ may be measured with an additional temperature sensor (not illustrated) located in the auxiliary cooling circuit 520 between the heat exchanger 525 and the auxiliary radiator 550 or it may be estimated with another mathematical model.

The control method then provides for the ECU 450 to calculate a difference E between the calculated value $T_{Inj}$ of the DEF injector temperature and a set-point value $T_{sp}$ thereof (block S115). The set-point value $T_{sp}$ of the DEF injector temperature may be a calibration parameter, which is determined as the maximum temperature that the DEF injector 282 can reach without being thermally stressed too much. The calculated difference E may then be used by the ECU 450 as input of a controller S120, for example a proportional (P) controller, a proportional-integrative (PI) controller or a proportional-integrative-derivative (PID) controller which, according to a feedback control approach, yields as output a correction value CV of the mass flow rate of the coolant, which is necessary to keep the temperature of the DEF injector 282 at the set-point value $T_{sp}$.

According to some embodiments, this correction value CV is added (block S125) to a base value BV of the coolant mass flow rate, thereby finally obtaining a requested value RV of the coolant mass flow rate according to the following formula:

$$RV=CV+BV$$

The base value BV of the coolant mass flow rate may be determined (block S130) with a feed forward control approach that uses the same thermal mathematical model of the DEF injector 282 obtained by solving the equation (1) as explained above, but replacing $T_{Inj}$ with $T_{sp}$ and $\dot{m}_c$ with BV. In other words, the method step S130 may provide for the ECU 450 to determine the value of each one of the following parameters: $T_2$, $T_1$, $T_{amb}$, V, I, $T_{u_1}$, $\dot{m}_g$, $\dot{m}_u$, $T_{Cout}$, $T_{Cin}$; and to calculate, with the mathematical model (1) describing the energy balance of the DEF injector 282, the base value BV of the coolant mass flow rate that corresponds to the set-point value $T_{sp}$ of the DEF injector temperature. In this way the requested value RV of the coolant mass flow rate reacts fast to possible changes of the engine working conditions, as represented by the parameters $T_2$, $T_1$, $T_{amb}$, V, I, $T_{u_1}$, $\dot{m}_g$, $\dot{m}_u$, $T_{Cout}$, $T_{Cin}$.

Knowing the requested value RV of the coolant mass flow rate, the control method finally provides for the ECU 450 to adjust (block S135) the operation of the auxiliary coolant pump 530 (e.g. the rotational speed of the electric motor 540), in such a way to deliver a mass flow rate of coolant corresponding to the requested value RV thereof in the auxiliary cooling circuit 520.

The method may then be repeated cyclically during the operation of the ICE 110 and of the DEF injector 282, thereby allowing a continuous regulation of the coolant mass flow rate delivered by the auxiliary coolant pump 530.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the an with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for thermally regulating an injector injecting a reducing agent into an exhaust pipe of an internal combustion engine, the internal combustion engine having an engine coolant circuit including a main coolant pump configured to deliver coolant from a main coolant tank to the internal combustion engine, and an auxiliary coolant circuit including an auxiliary pump configured to deliver the coolant from an auxiliary coolant tank to a heat exchanger in heat exchange relation with the injector, the auxiliary coolant tank in fluid communication with the main coolant tank to accumulate the coolant from the engine coolant circuit, the method comprising:
   activating, by a processor, the auxiliary pump to deliver a coolant in the auxiliary coolant circuit to the heat exchanger in heat exchange relation with the injector;
   determining, by the processor, a value of a mass flow rate of the coolant delivered by the auxiliary pump;
   calculating, by the processor, a value of a temperature of the injector as a function of the determined value of the mass flow rate;
   calculating, by the processor, a difference between the calculated value of the injector temperature and a predetermined set-point value thereof; and
   controlling, by the processor, the mass flow rate of the coolant delivered by the auxiliary pump based on the calculated difference.

2. The method according to claim 1, wherein the calculating, by the processor, the value of the injector temperature comprises solving, by the processor, a thermal mathematical model of the injector.

3. The method according to claim 2, wherein the solving, by the processor, the thermal mathematical model comprises using a value of at least one of the following parameters: a mass flow rate of an exhaust gas flowing into the exhaust pipe, a temperature of the exhaust gas, a mass flow rate of the reducing agent injected by the injector, a temperature of the reducing agent, a temperature of the coolant, an ambient temperature, a voltage applied to an electric coil actuating the injector, and an electric current flowing through the electric coil.

4. The method according to claim 1, wherein the controlling, by the processor, the mass flow rate of the coolant comprises:
   calculating, by the processor, a correction value of the mass flow rate of the coolant as a function of the calculated difference;
   calculating, by the processor, a base value of the mass flow rate of the coolant as a function of the set-point value of the injector temperature;
   calculating, by the processor, a requested value of the mass flow rate of the coolant as a sum of the base value and the correction value; and controlling, by the processor, the auxiliary pump to deliver the requested value of the mass flow rate of the coolant.

5. The method according to claim 4, wherein the calculating, by the processor, the correction value of the mass flow rate of the coolant comprises applying, by the processor, the calculated difference as input to a controller that yields as output the correction value.

6. The method according to claim 5, wherein the controller is selected from the group consisting of: a proportional controller, a proportional-integrative controller and a proportional-integrative-derivative controller.

7. The method according to claim 4, wherein the calculating, by the processor, the base value of the mass flow rate of the coolant comprises solving, by the processor, a thermal mathematical model of the injector.

8. The method according to claim 7, wherein the calculating, by the processor, the value of the injector temperature comprises solving, by the processor, a thermal mathematical model of the injector, and wherein the thermal mathematical model used for calculating the base value of the mass flow rate of the coolant is the same model used for calculating the value of the injector temperature.

9. A computer program product comprising a non-transitory computer readable medium having a computer program, which when executed on a computer having the processor, is operable to carry out the method according to claim 1.

10. An internal combustion engine having a control apparatus for controlling a temperature of an injector for injecting a reducing agent into an exhaust pipe of the internal combustion engine, the internal combustion engine comprising:

an engine coolant circuit including a main coolant pump configured to deliver coolant from a main coolant tank to the internal combustion engine;

an auxiliary coolant circuit including an auxiliary pump configured to deliver the coolant from an auxiliary coolant tank to a heat exchanger of the auxiliary cooling circuit in heat exchange relation with the injector, the auxiliary coolant tank in fluid communication with the main coolant tank to accumulate the coolant from the engine coolant circuit;

an electronic control unit having a processor configured to:

activate the auxiliary pump to deliver the coolant in the auxiliary coolant circuit to the heat exchanger in heat exchange relation with the injector;

determine a value of a mass flow rate of the coolant delivered by the auxiliary pump;

calculate a value of a temperature of the injector as a function of the determined value of the mass flow rate;

calculate a difference between the calculated value of the injector temperature and a predetermined set-point value thereof; and control the mass flow rate of the coolant delivered by the auxiliary pump based on the calculated difference.

11. The internal combustion engine of claim 10, wherein the auxiliary coolant circuit further comprises an auxiliary radiator downstream from the heat exchanger, the auxiliary radiator for cooling the coolant from the heat exchanger before the coolant returns to the auxiliary coolant tank.

* * * * *